(12) United States Patent
Drumright et al.

(10) Patent No.: US 7,015,302 B2
(45) Date of Patent: Mar. 21, 2006

(54) COPOLYMERS OF MONOCYCLIC ESTERS AND CARBONATES AND METHODS FOR MAKING SAME

(75) Inventors: Ray Drumright, Midland, MI (US); Mark Hartmann, Superior, CO (US); Richard A. Wolf, Midland, MI (US)

(73) Assignee: Natureworks LLC, Minnetonka, MN (US)

( * ) Notice: Subject to any disclaimer, the term of this patent is extended or adjusted under 35 U.S.C. 154(b) by 12 days.

(21) Appl. No.: 10/726,081

(22) Filed: Dec. 1, 2003

(65) Prior Publication Data

US 2004/0122185 A1    Jun. 24, 2004

Related U.S. Application Data

(63) Continuation of application No. 10/165,241, filed on Jun. 7, 2002, now abandoned.

(60) Provisional application No. 60/296,975, filed on Jun. 8, 2001.

(51) Int. Cl.
*C08G 64/00*    (2006.01)

(52) U.S. Cl. .................. 528/196; 264/219; 428/411.1; 525/439; 528/198

(58) Field of Classification Search ................ 264/219; 428/411.1; 525/439; 528/198
See application file for complete search history.

(56) References Cited

U.S. PATENT DOCUMENTS

| | | | |
|---|---|---|---|
| 3,072,680 A | 1/1963 | Starcher et al. ............. 260/343 |
| 4,379,138 A | 4/1983 | Pitt et al. ....................... 424/78 |
| 5,145,945 A | 9/1992 | Tang et al. ................... 528/370 |
| 5,210,108 A | 5/1993 | Spinu et al. .................. 521/182 |
| 5,340,889 A | 8/1994 | Crawford et al. ............ 525/523 |
| 6,087,469 A | 7/2000 | Epple et al. ................. 528/307 |
| 6,291,597 B1 | 9/2001 | Gruber et al. ............... 525/450 |

FOREIGN PATENT DOCUMENTS

| | | |
|---|---|---|
| EP | 0 632 081 | 6/1994 |
| GB | 2 277 324 | 10/1994 |

OTHER PUBLICATIONS

Trollsas et al., New Approach to Hyperbranched Polyesters: Self-Condensing Cyclic Ester Polymerization . . . , Macromolecules, vol. 32, 1999, p. 9062-9066.

Liu et al., A New Approach to Hyperbranched Polymers by Ring-Opening Polymerization of an AB Monomer . . . , Macromolecules, vol. 32, 1999, p. 6881-6884.

Nijenhuis et al., Crosslinked Poly(L-Lactide) and Poly(E-Caprolactone), Polymer, vol. 37, No. 13, 1996, p. 2783-2791.

*Primary Examiner*—Terressa Boykin
(74) *Attorney, Agent, or Firm*—Gary C Cohn PLLC

(57) ABSTRACT

Copolymers having repeating units derived from monocyclic esters or carbonates and certain bicyclic diesters and/or carbonates have controllable rheological properties. The bicyclic diester and/or carbonate copolymerizes easily with the monocyclic monomers, especially with lactide, to form copolymer that can have tailored levels of branching. The copolymers have excellent rheological properties, including increased melt tensions and improved shear thinning, compared to the analogous linear polymers.

16 Claims, 1 Drawing Sheet

COPOLYMERS OF MONOCYCLIC ESTERS AND CARBONATES AND METHODS FOR MAKING SAME

This application is a continuation of Ser. No. 10/165,241 filed Jun. 7, 2002, now abandoned which claims benefit of 60/296,975 filed Jun. 8, 2001.

BACKGROUND OF THE INVENTION

This invention relates to polyesters and/or carbonates that have modified rheological properties and methods for making those polyester and/or polycarbonates.

Certain monocyclic compounds can be polymerized to form polyesters or polycarbonates. Examples of those monocyclic esters include dioxanones (such as p-dioxanone), lactones (such as $\epsilon$-caprolactone or 4-valerolactone), dioxan(dione)s (such as glycolide, lactide or tetramethyl-1,4-dioxan-2,5-dione), carbonates such as ethylene carbonate and trimethylene carbonate, and ester-amides (such as morpholine-2,5-dione). Commercial interest in these polymers, particularly polylactide polymers (also known as polylactic acid, or PLA), is rapidly increasing. Unless modified in some way, these polyesters are linear molecules and therefore thermoplastic materials. They are useful for making a variety of films, fibers and other products. In the case of PLA, these polymers offer the significant advantages of being derived from renewable resources (lactic acid can be prepared from plant carbohydrates such as dextrose) and of being biodegradable. However, the rheological properties of these polymers are such that they can be difficult to process in certain applications. This difficulty in processing has so far limited the applications for which these polymers can be used. For example, in extrusion coating, poor rheological properties lead to phenomena such as neck-in and draw instability (draw resonance and edge weave). Poor rheological properties make it very difficult to make blow molded articles at all, and cause extruded foams to collapse because operating windows are extremely narrow.

The rheological property of primary interest is often melt elasticity, which is often expressed as "melt strength". Broadly speaking, it is desirable that a thermoplastic polymer forms a melt having a reasonably low shear viscosity so that it can be processed readily, but at the same time the molten polymer must possess enough strength that, once formed into a desired shape, it can hold that shape and in some instances even be worked with until it has time to cool and harden. As a general rule, melt strength can be increased in a thermoplastic resin by increasing the molecular weight. However, this also increases the shear viscosity so that the benefits of improved melt strength are offset by the increased force that is needed to shape the polymer in the first place. The increased force needed requires, at minimum, higher power consumption to process the polymer. In some cases this means that heavier, more expensive equipment is needed, or else processing rates must be reduced. In addition, increasing molecular weight tends to increase the processing temperatures that are required, and this exacerbates polymer degradation.

Accordingly, attempts to improve the processing characteristics of these polymers have tended to focus on introducing branching through some mechanism. In the case of PLA, for example, it has been attempted to copolymerize lactide with an epoxidized fat or oil, as described in U.S. Pat. No. 5,359,026, to treat PLA with peroxide, as described in U.S. Pat. Nos. 5,594,095 and 5,798,435, and to use certain polyfunctional initiators as described in U.S. Pat. Nos. 5,210,108 and 5,225,521 to Spinu, GB 2277324 and EP 632 081.

Unfortunately, none of these methods is entirely satisfactory. In some cases, the rheological properties of the polymer are not improved as much as desired. Good rheological improvements can be obtained in other cases but the manufacturing process is difficult to control, which makes it difficult to make the desired product in a reproducible way. Sometimes, the branching agent does not copolymerize well with the monocyclic ester or carbonate. This is particularly true in the case of lactide. In still other cases, the steps required to induce branching can interfere with the polymerization. This can lead to increased polymerization times, uneven product quality, and other problems.

It would be desirable to provide a polymer of a monocyclic ester (or corresponding hydroxy acid) and/or monocyclic carbonate, which polymer has improved rheological properties, yet remains processable at temperatures below that at which the polymer begins to degrade significantly. Biodegradability would be a further advantage. It is further desirable to provide a convenient process by which monocyclic esters and/or carbonates can be polymerized to form polymers having improved rheological properties, and in particular a process which is easily controllable to form polymers having predictable and reproducible rheological properties.

SUMMARY OF THE INVENTION

In one aspect, this invention is a copolymer having, in polymerized form, units derived from (a) a monocyclic ester or corresponding hydroxy acid or (b) a monocyclic carbonate, or both (a) and (b), and units derived from a bicyclic diester and/or carbonate.

Depending on the proportion of bicyclic diester and/or carbonate units the copolymer may range from slightly branched to densely crosslinked. Branching in these copolymers tends to be long-chain type branching, as described more below. In preferred embodiments, the proportion of bicyclic monomer units is such that the copolymer is a thermoplastic that exhibits excellent melt strength yet is readily melt processable. The preferred copolymers exhibit, for example, reduced neck-in and improved web stability when processed in extrusion coating, compared to the corresponding linear polyesters or polycarbonates, and are more easily processed in blow molding and extrusion foaming operations.

In another aspect, this invention is a method comprising subjecting a mixture including a monocyclic ester and/or carbonate and a bicyclic diester and/or carbonate to conditions sufficient to polymerize the mixture to form a copolymer having, in polymerized form, units derived from the monocyclic ester and/or carbonate and units derived from the bicyclic monomer.

This method provides a convenient, reproducible way to make copolymers that have a controlled amount of branching, as the extent of branching increases with increasing proportions of the bicyclic diester and/or carbonate. In the case where the monocyclic monomer is lactide, the polymerization reaction proceeds predictably, controllably and at nearly the same rates as lactide homopolymerizations under the same conditions. In the preferred embodiments in which a branched but noncrosslinked copolymer is desired, the process permits such a copolymer to be prepared with excellent control over its rheological properties and with minimal gelling.

DETAILED DESCRIPTION OF THE INVENTION

Figure 1:
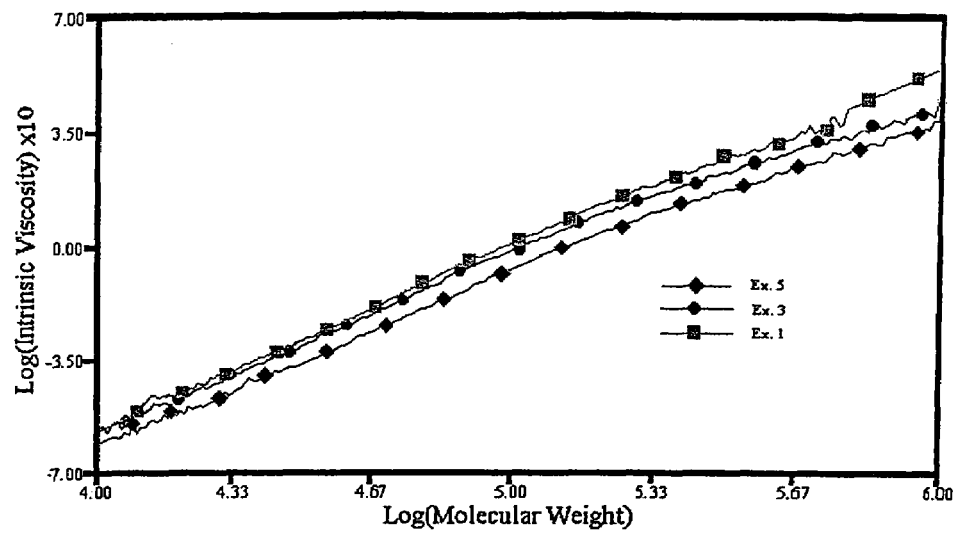
FIG. 1 is a graph showing the relationship between intrinsic viscosity and molecular weight for certain embodiments of copolymers of the invention.

For the purposes of this invention, the terms "polylactide", "polylactic acid" and "PLA" are used interchangeably to denote polymers having the repeating lactic acid units as described above, irrespective of how those repeated units are formed into the polymer.

The copolymer contains polymerized units derived from (a) a monocyclic ester or the corresponding hydroxy acid or (b) a monocyclic carbonate. For purposes of this invention, "monocyclic esters" include any monocyclic molecules that contain one or more ester linkages incorporated into the ring structure, and which are polymerizable. Similarly, "monocyclic carbonates" are any monocyclic molecules that contain one or more carbonate linkages incorporated into the ring structure, and which are polymerizable. Monocyclic esters (and the corresponding hydroxy acids) and monocyclic carbonates are referred to herein collectively as "monocyclic monomers". Examples of suitable monocyclic esters and carbonates include lactones such as ε-caprolactone or 4-valerolactone; dioxanones such as p-dioxanone; dioxan(dione)s such as glycolide, lactide or tetramethyl 1,4-dioxan-2,5-dione; carbonates such as ethylene carbonate and trimethylene carbonate; and ester-amides such as morpholine-2,5-dione. The hydroxy acids are hydroxyl-substituted carboxylic acids equivalent to those formed by hydrolyzing the ester group(s) of the corresponding monocyclic esters. The hydroxy acids include alpha-, beta-, gamma-, and epsilon-hydroxy carboxylic acids such as glycolic acid, dimethyl glycolic acid, lactic acid, epsilon-hydroxycaproic acid, alpha-hydroxy valeric acid, and the like. The copolymer may contain polymerized residues of two or more of these monomers, in block and/or random arrangement. Polylactide (PlA) copolymers are most preferred.

The copolymer also contains units derived from a bicyclic diester and/or dicarbonate (sometimes referred to herein collectively as "bicyclic monomers"). The units derived from the bicyclic monomer introduce branching sites into at least some of the copolymer molecules. The structure of the polymerized bicyclic monomer units is derived from that of the bicyclic monomer, which is a bridged cyclic compound having two ester and/or carbonate groups in a ring structure and at least one atom in the bridge. The bicyclic monomer can be represented as:

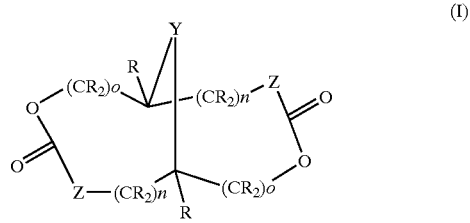

(I)

wherein each R is independently hydrogen, alkyl or inertly substituted alkyl, each n and each o is independently zero or a positive integer, and Y is a bridging group. Z is a covalent bond in the case of an ester group and —O— in the case of a carbonate group. R is preferably lower ($C_{1-4}$) alkyl and is most preferably hydrogen. Y is suitably —$(CR_2)_m$—, where m is a positive integer, —O—, —S—, —$NR^1$— (in which $R^1$ is alkyl or substituted alkyl) and the like or a combination of two or more of these groups. Each n is preferably no greater than 1. Each o is preferably zero. The values of each n and o, taken together, are more preferably so that the main ring (including the two ester and/or carbonate groups but excluding the —Y— bridge) contains 6 or 7 members in the case of esters and 8 or 9 members in the case of carbonates. Most preferably, each n is zero and each o is zero. Y is preferably —$(CR_2)_m$— where m is at least one, preferably 1, 2 or 3, and most preferably 2. Each Z is preferably a covalent bond, making the bicyclic monomer a diester. The most preferred bicyclic monomer is 2,5-dioxa-bicyclo[2.2.2]octane-3,6-dione. The preferred, more preferred and most preferred values of n, o, Y and m impart to the bicyclic monomer a reactivity similar to that of lactide, and thus enhance the ability of the bicyclic monomer to copolymerize with lactide.

Bicyclic monomers in which o is zero and Y is —$(CR_2)_m$— can be formed from substituted dicarboxylic acids of the form

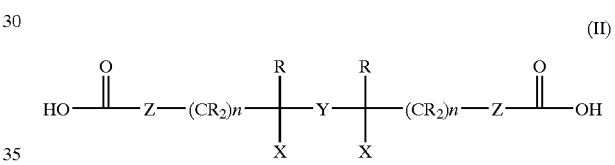

(II)

wherein R, Z, m and n are as defined before, and X is a group that will react with a carboxylic acid group to form a covalent bond to the carbonyl carbon, or a group that is displaced by the carboxylic acid group. X is preferably hydroxyl, halogen or —$NO_2$, and is more preferably chlorine or bromine. Substituted dicarboxylic acids of structure II can be prepared from the corresponding unsubstituted diacid chloride by reacting it with an agent that will introduce the X groups, and then reacting the resulting substituted diacid chloride with water if necessary to convert the acid chloride groups to free acid form. The bicyclic diester is then generated by heating the substituted dicarboxylic acid in the presence of a weak base such as sodium carbonate. Synthesis methods of this type are described, for example, by H. LeSueur, "The Action of Heat on α-hydroxycarboxylic Acids, Part IV, racemic α,α'-dihydroxyadipic acid and meso-α,α'-dihydroxyadipic acid", J. Chem. Soc. 1908, 93, 716–725; R. Kostyanovskii et al. in "The autofitting of dilactones from the d,l-forms of α,α'-dihydroxy-α,α'dimethylglutaric acid and α,α'-dihydroxy-α,α'-dimethyladipic acid", Bull. Acad. Sci. USSR Div. Chem. Sci. (Eng. Transl.) 1986, 35, 2420–2421; R. Kostyanovsky et al., "Autoassembly of cage structures 5:, Synthesis, stereochemistry and cyclization of α,α'-dihydroxy-α,α'dimethyladipic acid derivatives", Russian Chemical Bulletin, 1994, 43(4) 599–607; and Kostyanovsky et al., "Autoassembly of cage structures 9*, complete autoassembly of dilactones of α,α'dihydroxy-α,α'-dialkoxycarbonyladipic and -pimelic acids", Russian Chemical Bulletin 1995, 44(2) 318–321, all incorporated herein by reference.

Although the invention is not limited to any theory, it is believed that the bicyclic monomer reacts during polymerization conditions to open one of the ester or carbonate groups in the main ring to form a polymer containing a cyclic ester or carbonate group in the polymer chain, represented by the structure:

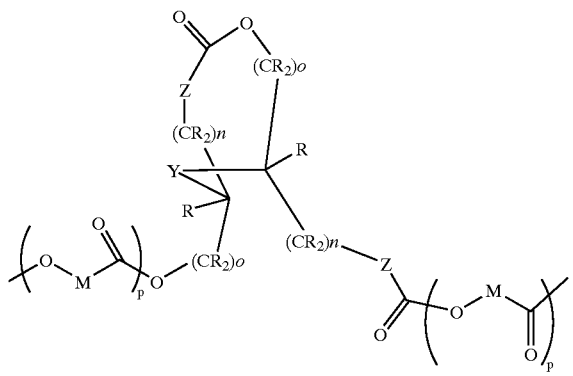

(III)

wherein O-M-C(O)— represents a polymerized unit of a monocyclic ester (or corresponding hydroxy acid) or carbonate monomer and p represents a positive number. The cyclic ester or carbonate group in the polymer chain can then undergo a further ring-opening reaction with additional monocyclic monomer (or hydroxy acid) to form a branch point having the structure

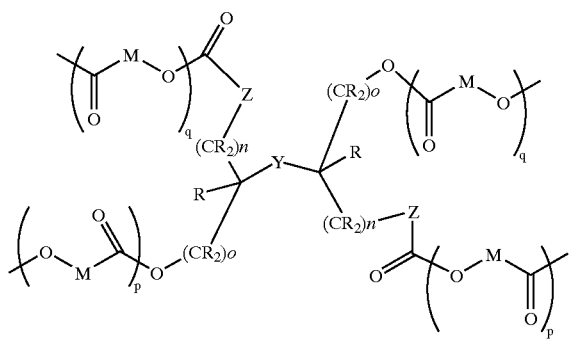

(IV)

wherein q represents a positive number.

As a result, it is believed that each unit of bicyclic monomer that undergoes this full sequence of reactions becomes incorporated into a copolymer molecule and creates a branch point where four polymer "arms" are joined. A more highly branched polymer molecule can be formed if more than one bicyclic monomer molecule is polymerized into the polymer chain. Depending on the proportion of bicyclic monomer that is used in making the copolymer, not all polymer molecules may contain a bicyclic monomer unit incorporated into them. In that case, the copolymer is in fact a mixture of linear polymers of the monocyclic monomer and branched copolymers that contain branch points derived from the bicyclic monomer. The latter case is generally true with the preferred thermoplastic copolymers.

The degree of branching in the copolymer depends on the amount of bicyclic monomer that is incorporated into it and the molecular weight of the copolymer. At a given molecular weight, increased bicyclic monomer use increases branching and can lead to crosslinking. The effect of lowering molecular weight is to permit the use of higher proportions of the bicyclic monomer without causing crosslinking. By varying the amount of incorporated bicyclic monomer and the molecular weight, branching can be controlled so that copolymers are produced having very light branching, heavier branching or even crosslinking. In this way, the rheological properties of the copolymer can be "tailored" to meet the processing demands of specific applications. To introduce branching but avoid significant crosslinking, the incorporated bicyclic monomer advantageously constitutes from about 0.05 to about 1.5 percent by weight of the polymer, although these amounts may increase or decrease, respectively, as the copolymer molecular weight is decreased or increased. Preferred amounts of the incorporated bicyclic monomer will vary according to the processing demands of particular applications. When light branching is desirable, the incorporated bicyclic monomer preferably constitutes from about 0.1 to about 0.3 percent of the weight of the polymer. To further modify the rheological properties of the copolymer, from about 0.3 to about 1.0 percent of the bicyclic monomer is incorporated into it, on the same basis. It has been found that thermoplastic PLA copolymers containing 0.3 weight percent or more incorporated bicyclic monomer often exhibit melt tensions exceeding 4 cN and even in the range of 6–16 cN, as determined by the method described in the Examples below. Values such as these are quite high for a PLA resin, and correlate to substantially improved processability in many applications.

A copolymer containing more than about 1.5% of incorporated bicyclic monomer will typically be crosslinked, although the precise amount of bicyclic monomer needed to induce crosslinking will depend somewhat on copolymer molecular weight. Depending on the degree of crosslinking that might be wanted for a particular application, the amount of incorporated bicyclic monomer may be as high as 99% by weight, but is more preferably no greater than about 50% by weight, more preferably no greater than about 15% by weight, and most preferably no greater than about 10% by weight.

The copolymer may also contain residues from one or more initiator compounds. These initiator compounds may be intentionally added to further refine the molecular weight and/or rheological properties of the copolymer or, as is particularly true in the case of lactide, are present as impurities in the monocyclic monomer, and react during the copolymerization process to initiate polymer molecules.

If the bicyclic monomer contains impurities, those impurities may also act as initiator compounds. Thus, it is preferred to either purify the bicyclic monomer (such as to reduce the level of impurities to <5 wt. %, preferably <2 wt. %, especially <1 wt. %), or to determine the number and type of impurities and take those impurities into account in manufacturing the copolymer.

The copolymer may further contain repeating units derived from other monomers that are copolymerizable with the monocyclic monomer, such as alkylene oxides (including ethylene oxide, propylene oxide, butylene oxide, tetramethylene oxide, and the like). Repeating units derived from these other monomers can be present in block and/or random arrangements. It is preferred that any such comonomer does not introduce branching points into the copolymer, as this makes it more difficult to control its rheological properties.

The thermoplastic copolymers advantageously have a number average molecular weight of from about 10,000, preferably from about 30,000, more preferably from about 40,000 to about 500,000, preferably to about 300,000, more preferably to about 250,000, as measured by the GPC/DV technique described in the Examples. The thermoplastic copolymers advantageously exhibit a polydispersity index (PDI, defined as the ratio of weight average molecular weight to number average molecular weight per the GPC/DV technique) of at least about 1.9, preferably at least about 2.1, more preferably at least about 2.5, to about 5, preferably to about 4, more preferably to about 3.5. They advantageously exhibit a die swell of at least about 1.05, preferably at least about 1.2, more preferably at least about 1.4 and especially from about 1.5, to about 2.0, preferably to about 1.8, when measured under the conditions described in the Examples.

Preferred copolymers exhibit a melt tension, measured as described in the Examples, of at least about 0.8 cN, preferably at least about 2 eN, more preferably at least about 4 cN, even more preferably at least about 6 cN, and most preferably at least about 12 cN, to about 16 cN or more. It is especially preferred that the copolymers have melt tensions within the foregoing ranges while simultaneously exhibiting melt flow rates, measured as described in the Examples, in the range of 1 to about 15 g/10 min, especially 4–12 g/10 min.

A preferred non-crosslinked copolymer will exhibit a die swell of at least about 1.1, preferably at least about 1.5, measured as described in the examples below. The preferred non-crosslinked copolymer will have a ratio of $M_{z+1}/M_n$ (measured as described in the following examples) of at least about 8, more preferably at least about 10, even more preferably at least about 15.

A preferred method of making the copolymers of the invention is through a copolymerization of the bicyclic monomer and a monocyclic ester and/or carbonate. In general, polymerization methods and conditions suitable for homopolymerizing the monocyclic esters and monocyclic carbonates can be used without significant modification, other than the inclusion of the bicyclic monomer into the reaction mixture. Suitable lactide polymerization processes are described in U.S. Pat. Nos. 5,247,059, 5,258,488 and 5,274,073 to Gruber et al; U.S. Pat. No. 5,288,841 to Bellis et al.; U.S. Pat. No. 2,951,828; and U.S. Pat. No. 5,235,031 to Drysdale et al., all incorporated herein by reference. Methods for polymerizing other monocyclic monomers are described in U.S. Pat. No. 5,288,841 to Bellis et al. and U.S. Pat. No. 5,225,521 to Spinu. The bicyclic monomer can be added by mixing it with other monomers, by feeding it to the reaction apparatus as a separate stream, by adding it as a solution in a suitable solvent, or any other convenient way.

A particularly suitable process for preparing PLA is described in U.S. Pat. Nos. 5,247,059, 5,258,488 and 5,274,073. This process is easily adapted to make the copolymers of this invention. In the process described in those patents, lactide is fed as a liquid directly to a polymerization system, where it is polymerized at elevated temperature in the presence of a catalyst. As molecular weight increases, an equilibrium is established between the polymer and free lactide, thus limiting the build-up of molecular weight and producing a polymer containing a certain amount of free lactide. The free lactide provides some plasticizing effect that is often undesirable, and also tends to coat the surfaces of polymer processing equipment. For these reasons, the polymerization process typically includes a devolatilization step during which the free lactide content of the polymer is reduced, preferably to less than 1% by weight, and more preferably less than 0.5% by weight.

The polymerization can be conducted batch-wise, semi-continuously or continuously. Continuous stirred-tank reactors and tube or pipe reactors are suitable types of polymerization vessels. A series of CSTRs or tube or pipe reactors may be used to conduct the polymerization in stages. This permits additives to be introduced at specific stages in the polymerization process if desired, and also allows for different reaction conditions to be used at different stages of the polymerization.

Suitable polymerization temperatures preferably are, for solventless processes, above the melting temperature of the monomer or monomer mixture and above the melting temperature of the product copolymer, but below the temperature at which significant polymer degradation occurs. A preferred temperature range is from about 100° C. to about 220° C. A more preferred temperature range is from 120° C. to about 200° C. and especially from about 160° C. to about 200° C. Residence times at polymerization temperatures are selected to produce a copolymer of the desired molecular weight and/or desired conversion of monomers.

Molecular weight and conversion are controlled by polymerization time and temperature, the equilibrium between free lactide and the polymer, and by the use of initiator compounds. In general, increasing quantities of initiator compounds on a molar basis will tend to decrease the molecular weight of the product polymer. Unless they are stringently purified, monocyclic monomers such as lactide tend to contain hydroxy-functional and/or acid-functional impurities that act as initiators during the polymerization process. If desired, additional initiator compounds can be added to provide additional control over molecular weight. Suitable such initiators include, for example, water, alcohols, glycol ethers, and polyhydroxy compounds of various types, such as ethylene glycol, propylene glycol, polyethylene glycol, poly propylene glycol, glycerine, trimethylolpropane, pentaerythritol, hydroxyl-terminated butadiene polymers and the like.

A wide variety of polymerization catalysts can be used, including various tin compounds such as $SnCl_2$, $SnBr_2$, $SnCl_4$, $SnBr_4$, SnO, organotin compounds such as tin (II) bis(2-ethyl hexanoate), butyltin tris(2-ethyl hexanoate), hydrated monobutyltin oxide, dibutyltin dilaurate, tetraphenyltin and the like; PbO, zinc alkoxides, zinc stearate, organoaluminum compounds such as aluminum alkoxides, organoantimony compounds such as antimony triacetate and antimony (2-ethyl hexanoate), organobismuth compounds such as bismuth (2-ethyl hexanoate), calcium stearate, magnesium stearate, certain yttrium and rare earth compounds such as are described in U.S. Pat. No. 5,208,667 to McLain et al, and the like. Catalysts are used in catalytically effective amounts, which depend somewhat on the particular catalyst, but are usually in the range of from about 1 mole catalyst to about 3000–50,000 moles monomers. Preferred catalyst concentrations are in excess of 5000 moles monomers per mole catalyst, and especially in excess of 10,000 moles monomers per mole catalyst. The catalyst may be supported if desired to facilitate its removal.

In order to produce a melt-stable lactide polymer, it is preferred to remove or deactivate the catalyst at the end of the polymerization process. This can be done by precipitating the catalyst or preferably by adding an effective amount of a deactivating agent to the polymer. Catalyst deactivation is suitably performed by adding a deactivating agent to the polymerization vessel, preferably prior to the devolatilization step. Suitable deactivating agents include carboxylic acids, of which polyacrylic acid is preferred; hindered alkyl, aryl and phenolic hydrazides; amides of aliphatic and aromatic mono- and dicarboxylic acids; cyclic amides, hydrazones and bishydrazones of aliphatic and aromatic aldehydes, hydrazides of aliphatic and aromatic mono- and dicarboxylic acids, bis-acylated hydrazine derivatives, phosphite compounds and heterocyclic compounds.

Certain hydroxy acids, particularly α-hydroxy acids such as lactic acid, exist in two optical isomers, which are generally referred to as the "D" and "L" isomers. Either D- or L-lactic acid can be produced in synthetic processes, whereas fermentation processes usually tend to favor production of the L isomer. Lactide similarly exists in a variety of isomeric forms, i.e., "L-lactide", which is a dimer of two L-lactic acid molecules, "D-lactide", which is a dimer of two D-lactic acid molecules and "meso-lactide", which is a dimer formed from one L-lactic acid molecule and one D-lactic acid molecule. In addition, 50/50 mixtures of L-lactide and D-lactide that have a melting temperature of about 126° C. are often referred to as "D,L-lactide". Any of these forms of lactide, or mixtures thereof, can be copolymerized in accordance with this invention. Increased optical purity (i.e., higher concentrations of D- or L-isomer) tends to cause the resulting polymer to be more crystalline. When a semi-drystalline polymer is desired, it is preferred that the polymer contains either L- or D-lactic acid units alone or else contains a mixture of both L- and D-lactic acid units in which one of the isomers (either L- or D-) constitutes at most about 3 mole %, preferably up to about 2 mole %, more preferably up to about 1.6 mole %, and especially up to about 1.2 mole percent of the isomeric units in polymerized form. Particularly preferred semi-crystalline copolymers contain from 98.4 to 100% L isomer and from 0 to 1.6% D isomer (based on total moles of lactic acid repeating units). When more amorphous polymers are desired, the ratio of L- and D-isomer repeating units in the copolymer is suitably from about 98:2–2:98, preferably from 90:10 to 10:90, especially from about 70–90% L-isomers and 10–30% D isomers (based on total moles of lactic acid repeating units). Generally, the selection of stereoisomer ratios will depend on the particular application and/or desired copolymer properties. In general, the higher the crystallinity, the higher are the thermal performance and the modulus of the copolymer.

Certain of the bicyclic monomers may also exist as two or more stereoisomers. An example of this is the 2,5-dioxa-bicyclo[2.2.2]octane-3,6-dione described in the examples below. If the bicyclic monomer is not optically pure, the ratio of stereoisomers may affect crystallinity, and should be taken into account, together with the stereoisomer content of the monomers (i.e., the monocyclic ester (or corresponding hydroxy acid) and a monocyclic carbonate), in the manufacture of the copolymer, so that desired properties are obtained.

A preferred lactide is produced by polymerizing lactic acid to form a prepolymer, and then depolymerizing the prepolymer and simultaneously distilling off the lactide that is generated. Such a process is described in U.S. Pat. No. 5,274,073 to Gruber et al., which is incorporated herein by reference.

When lactide copolymers are to be made, the comonomer is introduced into the polymerization apparatus. This can be done by blending the comonomer with the monocyclic ester, by adding the comonomer neat as a separate stream, or by adding the comonomer as a solution in a suitable solvent. Comonomers can be copolymerized randomly or sequentially to form random and/or block copolymers.

Another method of preparing the copolymer is to blend the bicyclic monomer with a previously-formed polymer of monocyclic esters and/or carbonate, and then subject the mixture to transesterification conditions.

Thermoplastic copolymers of the invention are useful in a variety of applications, such as fibers (including staple fibers, monofilament fibers, blended fibers, textured fibers, bicomponent fibers, yarns and the like), films such as cast film, blown film, oriented film (including biaxially oriented film where stretching is performed in two directions either simultaneously or sequentially), extruded foam, blow molding, compression molding, sheet molding, injection molding, extrusion coating, paper coating and other applications. In general, the copolymer of the invention can be used in the same applications as the corresponding homopolymers are used, plus additional applications where better rheological properties are desirable. The copolymer is particularly useful in applications where excellent shear thinning and/or high melt tension are desirable.

The copolymers of this invention exhibit improved shear thinning and melt tension compared to linear polymers of the same monocyclic monomer (at equivalent $M_w$). It is therefore possible to obtain good processing at an equivalent or lower molecular weight than is needed for the corresponding linear polymers to be processable. This gives the processor the option of using lower processing temperatures and/or pressures, thus reducing polymer degradation (monomer reformation, molecular weight loss and color generation), reducing energy consumption, and in some instances permitting the use of smaller, less expensive equipment.

Of course, the copolymer of the invention can be compounded with additives of all types, including antioxidants, preservatives, catalyst deactivators, stabilizers, plasticizers, fillers, nucleating agents, colorants of all types and blowing agents. The copolymer may be blended with other resins, and laminated or coextruded to other materials to form complex structures.

The copolymer of this invention can also be blended with additional amounts of linear polylactic acid polymers to produce a blended polymer having tailored rheological properties. It can also be blended with other polymers, such as polyesters, polyhydroxyalkanoates, polycarbonates, polystyrenics, polyolefins and the like.

The following examples are provided to illustrate the invention but are not intended to limit the scope thereof. All parts and percentages are by weight unless otherwise indicated.

EXAMPLES 1–5

A. Preparation of 2,5-dioxa-bicyclo[2,2,2]octane-3,6-dione (Bicyclic Diester)

Freshly distilled adipic acid dichloride (100.65 parts) is loaded into a 3-necked flask equipped with a reflux condenser, dropping funnel and stirrer. The adipic acid dichloride is heated to 100° C., and 193.6 parts bromine ($Br_2$) is added over about 48 hours with stirring. Volatiles are removed by applying vacuum (20 Torr, 0.5 hour) to yield 187 parts of a mixture of meso and d,l-forms of α,α'-dibromoadipic acid dichloride.

The α,α'-dibromoadipic acid dichloride is added slowly with vigorous stirring to 1750 parts ground ice, so that an emulsion of highly-dispersed oil droplets in water is formed. Stirring is continued for about 10 hours, during which time the oil droplets form into soft pieces and then into a hard powder. The emulsion is then filtered, washed with water and dried in open air. One hundred fifteen parts of a mixture of meso and d,l-forms (~2.0 ratio) of α,α'-dibromoadipic acid having a melting point of 185–188° C. are recovered. The water phase is extracted twice with 500 ml diethyl ether. The ether extracts are dried over $CaCl_2$ and concentrated to yield an additional 46 parts of a mixture of meso and d,l-forms (~1.4 ratio) of α,α'-dibromoadipic acid having a melting point of 135–149° C. The separate portions of product α,α'-dibromoadipic acid are combined.

One hundred parts of the α,α'-dibromoadipic acid in ~800 parts acetonitrile are charged to a flask equipped with two reflux condensers and a stirrer. The solution is heated to boiling and, with stirring, 35 parts of $Na_2CO_3$ is added over about 1 hour through the top of a condenser. The condenser is periodically washed with a small portion of acetonitrile. The mixture is then heated to reflux for six hours. Upon subsequent cooling, a precipitate is formed, which is filtered off. The filtrate is evaporated under vacuum (20 Torr) at room temperature. The residue is dissolved in 100–150 parts 96% ethanol and the solution refrigerated. Approximately 20 parts of product are obtained, which are sublimed under vacuum (90° C., 1–1.5 Torr) to yield 18–19 g of α,α'-2,5-dioxa-bicyclo[2.2.2]octane-3,6 having a melting temperature of 136.5° C.

B. Lactic Copolymer Polymerization

Copolymers of α,α'-2,5-dioxa-bicyclo[2.2.2]octane-3,6,dione and L-lactide (1.08% D isomer) are prepared using a polymerization system including three tube reactors and a devolatilizer. Each of the tube reactors is a stainless steel tube 18.5 inches long with an internal diameter of 2.5 inches containing internal static mixing elements. Each of the tube reactors is divided into three heated zones. During the copolymerizations, the tube reactor is heated at 130° C., the second at 180° C. and the third at 185° C. The first and second tube reactors are connected by a transfer line that is held at 180° C. The second and third tube reactors are connected by a transfer line that is held at 200° C. The lactide is introduced into the bottom of the first tube reactor, is transferred from top of the first tube reactor to the bottom of the second tube reactor, is transferred from the top of the second tube reactor to the bottom of the third tube reactor, and is transferred from the top of the third tube reactor to the devolatilizer through a heated transfer line equipped with a divert valve. The devolatilizer consists of an electrically heated flat plate heater followed by a 15"×1" diameter single-screw extruder which pumps the polymer melt out of a die. The flat plate heater is operated at 250° C. and the extruder is operated at 190–200° C. The unreacted monomers that are removed in the devolatilizer are trapped in a traced and insulated carbon steel 37"×4" diameter column at 20° C. The entire polymerization system is computer controlled.

The lactide used, if homopolymerized, would be predicted to form a polymer having a $M_n$ of 101,000 daltons. The lactide is melted, held in a feed tank, and fed to the bottom of the first tube reactor using a mass flowmeter at a rate of 454 grams/hour. A separate feed of 25% tin octoate in toluene is pumped into the bottom of the second tube reactor at a rate of 4.38 microliters/minute. The α,α'-2,5-dioxa-bicyclo[2.2.2]octane-3,6,dione is fed on demand as a 15% solution in gamma-butyrolactone to the bottom of the first tube reactor with a diaphragm pump using a shot tube. A 25% polyacrylic acid solution in N-methylpyrrolidinone is pumped into the center zone of the third tube reactor at a rate of 13 microliters/minute, in order to kill the catalyst.

Control Sample A and Examples 1–5 are made by varying the amount of α,α'-2,5-dioxa-bicyclo[2.2.2]octane-3,6,dione that is fed into the polymerization system.

For control Sample A, no α,α'-2,5-dioxa-bicyclo[2.2.2]octane-3,6,dione is added.

For Examples 1–5, the amount of α,α'-2,5-dioxa-bicyclo[2.2.2]octane-3,6,dione added is 0.1%, 0.2%, 0.4%, 0.4% and 0.6%, respectively, based on the total weight of monomers fed.

Analysis of the resulting polymers is summarized in the following table.

|  | Sample/Example No. | | | | | |
|---|---|---|---|---|---|---|
| Property | A* | 1 | 2 | 3 | 4 | 5 |
| % bicyclic diester | 0 | 0.1 | 0.2 | 0.4 | 0.4 | 0.6 |
| $M_n$, PS standard[1] | 100,300 | 86,200 | 88,300 | 85,000 | 90,900 | 91,300 |
| $M_w$, PS standard[1] | 195,400 | 171,200 | 195,900 | 227,000 | 251,400 | 287,600 |
| PDI, PS standard[1] | 1.95 | 1.99 | 2.22 | 2.67 | 2.77 | 3.15 |
| $M_z$, PS standard[1] | ND | 284,900 | 370,600 | 523,400 | 630,800 | 854,500 |
| $M_{z+1}$, PS standard[1] | ND | 424,000 | 596,500 | 950,200 | 1,279,100 | 1,833,000 |
| $M_n$, Absolute[2] | ND | 48,500 | 51,400 | 45,900 | 50,000 | 50,800 |
| $M_w$, Absolute[2] | ND | 113,600 | 127,400 | 170,000 | 181,200 | 222,700 |
| PDI, Absolute[2] | ND | 2.34 | 2.48 | 3.70 | 3.62 | 4.38 |
| $M_z$, Absolute[2] | ND | 215,400 | 279,600 | 498,600 | 527,800 | 706,200 |
| MFR, g/10 min[3] | ND | 11.1 | 10.4 | 6.5 | 6.6 | 5.2 |
| Die swell[3] | ND | 1.07 | 1.19 | 1.54 | 1.52 | 1.66 |
| Residual lactide, % | 8.73** | 0.83 | 0.81 | 0.63 | 1.2 | 1.6 |

Notes:
*not an example of this invention.
** Measured from a sample taken before devolatilization. All other residual lactide values are post-devolatilization.
ND = not determined.
[1]Molecular weights determined by gel permeation chromatography against polystyrene standards. One gram PLA/copolymer samples are dissolved in 0.2 mL solvent (tetrahydrofuran for amorphous samples, methylene chloride for semicrystalline samples), and then diluted with 5.5 mL tetrahydrofuran and filtered through a 0.45 micron syringe filter. Approximately 50 microliters of the filtered solution are injected into a Waters model 717 autosampler/autoinjector.

-continued

| | Sample/Example No. | | | | | |
|---|---|---|---|---|---|---|
| Property | A* | 1 | 2 | 3 | 4 | 5 |

The mobile phase is tetrahydrofuran pumped at 1 mL/min. The separation is performed on three Waters Styragel HR columns that are connected in series (5 micron particle size, 300 mm × 7.8 mm columns with pore sizes of $10^5$ Å, $10^4$ Å and $10^1$ Å). The temperature of the column set and detector is 35° C. The detector is a Waters model 410 differential refractometer. Data is analyzed with Millenium 32 software.
[2]Molecular weights determined by GPC/DV. 0.75 g samples are dissolved in 25 mL chloroform. A 1 mL aliquot of stock solution is transferred to a 10 mL volumetric flask and diluted to the mark with chloroform. Samples are filtered through a 0.45 micron syringe filter into an autosampler vial. A Waters Alliance 2690 Liquid Chromatography system is used as the pump and autosampler. The eluent is chloroform, the flow rate is 1 mL/min and the temperature is 35° C.
The injection volume is 0.050 mL. Three PL-gel mixed-B columns (300 × 25 mm, part #1210-6100) are used. The detector is a Viscotek Model 250 Differential Viscometer/Refractometer. The data is collected and analyzed on a personal computer running TriSEC GPC software, using universal calibration with a 3$^{rd}$ order curve fit. Narrow fraction polystyrene standards from American Polymer Standards Corporation are used to establish the universal calibration plot.
[3]Polymer pellets are dried at 100° C. under vacuum overnight in a vacuum over swept with nitrogen at 100 cc/min. Dried samples are removed from the oven, capped and run immediately. Melt flows are measured on a Tinius Olsen Extrusion Plastometer at 210° C. with a weight of 2.16 kg and die diameter of approximately 0.0825 inches. Sample pellets are loaded into the barrel of the apparatus and held there for five minutes prior to applying the load.
An average of at least three measurements of 1 minute each are used to calculate the melt flow rate. Samples for die swell measurements are collected during the melt flow runs. Approximately 1 inch lengths of molten polymer strand are cut off at the die and cooled. The diameter of the strands is measured and divided by the known diameter of the die to give melt swell. Reported results are an average of at least 5 measurements.

The data in the foregoing table indicates that branching is introduced into the copolymer Examples. The $M_n$ values (both PS standard and absolute) remain nearly unchanged as the amount of bicyclic diester is increased, whereas the $M_w$ and higher molecular weight moments ($M_z$ and $M_{z+1}$) increase significantly with increasing use of the bicyclic diester. Absolute molecular weight measurements show that these higher molecular weight moments are due in significant part to a high molecular weight shoulder, which increases as the amount of bicyclic diester is increased. Die swell also increases with increasing use of the bicyclic diester. Melt flow rates decrease as the bicyclic diester content increases, but the drop is not precipitous and the reported values are representative of an easily processable thermoplastic.

The presence of the branches can be inferred from chromatographic measurements such as polydispersity. In addition, branching can be qualitatively and quantitatively determined from size exclusion chromatography with multiple detectors. Plotting the log of dilute solution viscosity against the log of molecular weight (Mark-Houwink plot) is another appropriate tool for determining branching. In general, polymers having branches will tend to have a lower dilute solution viscosity, at a given molecular weight, than an otherwise similar linear polymer. Mark-Houwink plots for copolymer Examples 1, 3 and 5 are given in FIG. 1. FIG. 1 indicates that, at any given molecular weight, a copolymer made with more bicyclic diester will have a lower dilute solution viscosity. These data are clear indications that these copolymers are branched, and that the high molecular weight shoulder is mainly due to the presence of branched molecules.

Figure 2:
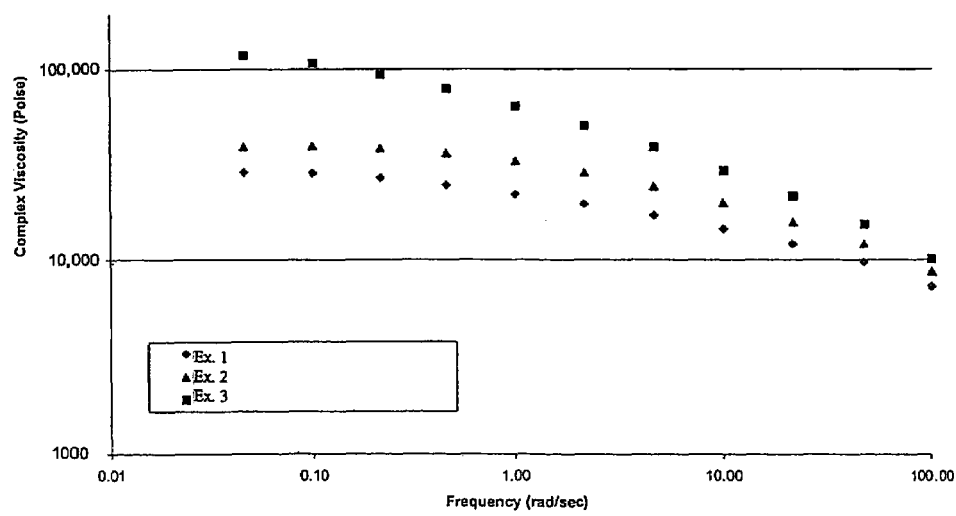
FIG. 2 is a graph showing dynamic mechanical spectroscopy data for certain embodiments of copolymers of the invention.

The length of the branches is often inferred from Theological measurements, and increases in characteristics such as die swell and melt strength indicate the presence of long-chain branches. Yet another suitable method of inferring the existence of long chain branches is dynamic mechanical spectroscopy. Copolymer Examples 1, 2 and 3 are each dried overnight at 100° C. in a vacuum oven, and placed in a dessicator containing phosphorous pentoxide drying agent. Dynamic mechanical spectroscopy testing is performed within 8 hours of removing the samples from the oven, using a Rheometrics RDS-2 spectrometer running under Rhios 4.4.4 software for machine control and data collection. Specimens are heated to 210° C. and immediately cooled to 180° C. for testing. Samples are run using 25 mm parallel plates, from 100 to 0.01 rad/s at 5% strain. The results are shown graphically in FIG. 2. From these results, it is seen that as the amount of bicyclic diester increases, the low shear viscosity also increases. All of the copolymers exhibit significant shear thinning, but this effect becomes more pronounced as the amount of bicyclic diester increases. Both of these effects indicate that the copolymers are long-chain branched.

The melt tension of copolymer Examples 1, 2, 3 and 5 is evaluated on a Goettfert test frame. The sample is packed into the capillary rheometer and extruded at 190° C. at a shear rate of 33 sec$^{-1}$ through a die 30 mm long and 2 mm in diameter. Melt tension is measured with a wheel sensitivity in the range of 1–1000 cN. The wheels of the melt tension apparatus are located 110 mm below the capillary die. Results are:

| Example No. | % Bicyclic diester | Melt Tension (cN) |
|---|---|---|
| 1 | 0.1 | ~0.8 |
| 2 | 0.2 | ~2.0 |
| 3 | 0.4 | ~8.5 |
| 5 | 0.6 | ~13.5 |

These results show that melt tension also increases with increasing bicyclic diester content, and demonstrates how copolymer properties can be tailored through adjustments in bicyclic diester level. Examples 3 and 5 in particular exhibit excellent melt tension values for a PLA resin.

C. Blown Film Processing

Copolymer Example 4 is selected for processing into blown film. The sample is dried in a desiccant drier for 1–½ days at 40° C., –40° C. dew point. It is processed into monolayer blown film on a 1" Killion three-zone extruder with a 40/80/40 mesh screen pack, through a 3" diameter die with a 0.035" die gap at a rate of 13 pounds/hour. Extruder temperatures are 300° F. in zone 1, 345° F. in zone 2 and 365° F. in zone 3, at the clamp and at the die. Haul-off rates are 22 feet/minute.

The line is started up and run for a period with PLA homopolymer to purge the system, and film is then produced with Copolymer Example 4 for about 15 minutes. Bubble stability is excellent and the film has very few gels. The film has little to no crystallinity as measured by DSC, but is easily crystallized when oriented by stretching.

It will be appreciated that many modifications can be made to the invention as described herein without departing from the spirit of the invention, the scope of which is defined by the appended claims.

What is claimed is:

1. A thermoplastic or crosslinked copolymer having, in polymerized form, units derived from a (a) monocydic ester or corresponding hydroxy acid or (b) a monocycic carbonate, or both (a) and (b), and units derived from a bicylic diester and/or carbonate having the structure

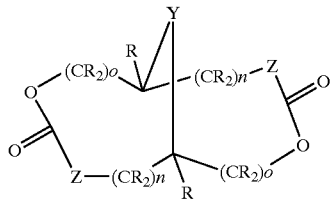

wherein each R is independently lower ($C_{1-4}$) alkyl or hydrogen, each Z is —O— or a covalent bond, each n and each o are independently zero or a positive integer, provided that the values of n and o, taken together, are such that the main ring contains 6 or 7 members when each Z is a covalent bond and 8 or 9 members when each Z is —O—, and Y is —$(CR_2)_m$— where m is 1, 2 or 3, wherein the copolymer contains from about 0.05 to about 1.5 weight percent, based on the total weight of the copolymer, of units derived from a bicyclic diester and/or carbonate.

2. The copolymer of claim 1, wherein the monocyclic ester is lactide.

3. The copolymer of claim 2 wherein the bicyclic diester is 2,5-dioxa-bicyclo[2.2.2]octane-3,6-dione.

4. The copolymer of claim 3 that has a number average molecular weight of from about 10,000 to about 500,000, as measured by the GPC/DV method.

5. The copolymer of claim 4 wherein the copolymer is semicrystalline and contains from about 98.4 to 99.9 percent of units derived from either the D or L isomer of lactic acid, based on the total moles of the lactic acid units, and from about 0.1 to about 1.6 percent of units derived from the other isomer, based on the total moles of the lactic acid units.

6. The copolymer of claim 5 which contains from about 0.3 to about 1.0 weight percent, based on the total weight of the copolymer, of repeating units derived from the bicyclic diester.

7. The copolymer of claim 4 wherein the copolymer contains up to about 98 percent of units derived from either the D or L isomer of lactic acid, based on the total moles of the lactic acid units, and about 2 percent or more of units derived from the other isomer, based on the total moles of the lactic acid units.

8. The copolymer of claim 7 that contains from about 0.3 to about 1.0 weight percent, based on the total weight of the copolymer, of units derived from the bicyclic diester.

9. A method comprising subjecting a mixture including lactide and a bicyclic diester and or carbonate to conditions sufficient to polymerize the mixture to form a copolymer having units derived from the monocyclic ester and/or carbonate and repeating units derived from the bicyclic diester and or carbonate, wherein the bicyclic diester and/or carbonate is 2,5-dioxa-bicyclo[2.2.2]octane-3,6-dione.

10. The method of claim 9 wherein the copolymer contains at least about 98 weight percent of units derived from either the D or L isomer of lactic acid, and up to about 2 weight percent of units derived from the other isomer, based on the total weight of the lactic acid.

11. The method of claim 10, wherein the bicyclic diester and/or carbonate constitutes about 0.3 to about 1.0 weight percent, based on the total weight of the monomers.

12. The method of claim 9 wherein the copolymer contains no more than about 98 weight percent of units derived from either the D or L isomer oflactic acid, and at least about 2 weight percent of units derived from the other isomer, based on the total weight of the lactic acid.

13. The method of claim 12, wherein the bicyclic diester and/or carbonate constitutes about 0.3 to about 1.0 weight percent, based on the total weight of the monomers.

14. The copolymer of claim 2 which has a melt flow rate at 210° C. and under a weight of 2.16 kg of from about 4–12 g/10 min has a melt tension of at least about 2 cN.

15. The copolymer of claim 14 which has a melt tension of at least 12 cN.

16. The copolymer of claim 14 which has a melt tension of at least 6 cN.

* * * * *